(12) United States Patent
Vicknair et al.

(10) Patent No.: US 10,008,880 B2
(45) Date of Patent: Jun. 26, 2018

(54) MODULAR HYBRID LOW EMISSIONS POWER FOR HYDROCARBON EXTRACTION

(71) Applicant: BJ Services, LLC, Tomball, TX (US)

(72) Inventors: Bruce A. Vicknair, The Woodlands, TX (US); Blake C. Burnette, Tomball, TX (US); Pierce Dehring, Tomball, TX (US)

(73) Assignee: BJ Services, LLC, Tomball, TX (US)

( * ) Notice: Subject to any disclaimer, the term of this patent is extended or adjusted under 35 U.S.C. 154(b) by 965 days.

(21) Appl. No.: 14/298,216

(22) Filed: Jun. 6, 2014

(65) Prior Publication Data
US 2015/0354322 A1   Dec. 10, 2015

(51) Int. Cl.
*H02J 3/14* (2006.01)
*H02J 13/00* (2006.01)
*H02J 3/38* (2006.01)

(52) U.S. Cl.
CPC ............ *H02J 13/0006* (2013.01); *H02J 3/14* (2013.01); *H02J 3/381* (2013.01);
(Continued)

(58) Field of Classification Search
CPC ............. Y10T 307/587; Y10T 307/576; Y10T 307/696; Y10T 307/702; Y10T 307/718;
(Continued)

(56) References Cited

U.S. PATENT DOCUMENTS 4,469,954 A  *  9/1984  Maehara .................. H02B 1/52
                                          290/1 A
7,307,399 B2   12/2007  Furem
(Continued)

FOREIGN PATENT DOCUMENTS

| EP | 0314849 A1 | 1/1994 |
| WO | 2012137068 A2 | 10/2012 |
| WO | 2012154990 A2 | 11/2012 |

OTHER PUBLICATIONS

Conductus About Superconducting Wire, STI—Superconducter Technologies, Inc., 2014, 3 pages, http://www.suptech.com/about_superconducting_wire_n.php.
(Continued)

*Primary Examiner* — Fritz M Fleming
(74) *Attorney, Agent, or Firm* — Bracewell LLP; Constance G. Rhebergen; Keith R. Derrington

(57) ABSTRACT

A system for supplying electric power includes: a plurality of electric motors coupled to well treatment pumps; a mobile substation that receives power from a utility electric grid; a plurality of mobile electric power generating units; a controller configured to (i) receive a total required flow rate of the liquid; (ii) calculate a total amount of electric power required to achieve the required total flow rate; (iii) receive an amount of power available from the utility electric grid; (iv) direct the substation to provide electric power to the plurality of electric motors; and (v), direct one or more electric power generating units in the plurality of electric power generating units to provide electric power to the plurality of electric motors according to a priority order to meet the total amount of electric power, if the required amount of electric power exceeds the amount of power available from the utility grid.

21 Claims, 6 Drawing Sheets

(52) U.S. Cl.
CPC .. *H01M 2250/10* (2013.01); *H01M 2250/402* (2013.01); *H02J 3/387* (2013.01); *Y02B 90/12* (2013.01); *Y02B 90/14* (2013.01)

(58) Field of Classification Search
CPC . Y10T 307/729; H02J 3/40; H02J 3/42; H02J 3/46; Y02B 70/3225; Y04S 20/222
USPC ............................. 307/57, 59, 80, 81, 84, 86
See application file for complete search history.

(56) References Cited

U.S. PATENT DOCUMENTS

| | | | | |
|---|---|---|---|---|
| 7,619,324 | B2* | 11/2009 | Folken | H02J 3/38 |
| | | | | 307/84 |
| 7,876,061 | B2* | 1/2011 | Wright | H02J 3/008 |
| | | | | 290/40 B |
| 8,047,285 | B1 | 11/2011 | Smith | |
| 8,148,844 | B2 | 4/2012 | Pan | |
| 8,376,070 | B2 | 2/2013 | Waszak et al. | |
| 8,489,667 | B2 | 7/2013 | Ewing et al. | |
| 8,494,661 | B2 | 7/2013 | Ewing et al. | |
| 8,742,620 | B1* | 6/2014 | Brennan | H02J 3/383 |
| | | | | 307/59 |
| 2010/0090543 | A1* | 4/2010 | Cobb | H01F 27/002 |
| | | | | 307/149 |
| 2011/0163603 | A1* | 7/2011 | Chou | H02J 3/381 |
| | | | | 307/66 |
| 2012/0255734 | A1 | 10/2012 | Coli et al. | |
| 2013/0206411 | A1 | 8/2013 | Zhang et al. | |
| 2013/0306322 | A1 | 11/2013 | Sanborn et al. | |
| 2014/0240902 | A1* | 8/2014 | Burch | H02B 7/06 |
| | | | | 361/626 |
| 2015/0027712 | A1* | 1/2015 | Vicknair | E21B 43/162 |
| | | | | 166/305.1 |
| 2015/0211512 | A1* | 7/2015 | Wiegman | F04B 23/06 |
| | | | | 417/2 |
| 2015/0300336 | A1* | 10/2015 | Hernandez | F04B 47/02 |
| | | | | 417/45 |
| 2016/0177678 | A1* | 6/2016 | Morris | F01D 15/00 |
| | | | | 60/772 |
| 2017/0237264 | A1* | 8/2017 | Johnson | H02J 3/46 |
| | | | | 307/84 |

OTHER PUBLICATIONS

Conductus Superconducting Cables, Superconductor Technologies, Inc., www.supertech.com, 2 pages.
Eckroad, S., "Superconducting Power Equipment" Technology Watch 2012, Electric Power Research Institute, Technical Update, Dec. 2012, 114 pages.
Eckroad, S., "Superconducting Power Cables", Technology Watch 2009, Technical Update, Dec. 2009, Electric Power Research Institute, 63 pages.
Sable, "Comprehensive Power Power It Up", Proprietary GreenRig Introduction, Sep. 12, 2013, 16 pages.

* cited by examiner

MODULAR HYBRID LOW EMISSIONS POWER FOR HYDROCARBON EXTRACTION

BACKGROUND

Extraction of hydrocarbons requires many types of energy-consuming machines. These machines are required at field sites that have boreholes through which the hydrocarbons are extracted.

Hydraulic fracturing is a common technique for treatment of reservoirs in earth formations. In hydraulic fracturing, certain types of liquids are injected into boreholes that penetrate the earth formations at pressures high enough to fracture the formation rock. The fractured rock creates spaces that are interconnected and allow the hydrocarbons of interest to flow for extraction purposes.

In order to create a large number of fractures needed to extract the hydrocarbons, high pressure and high flow pumps are required to inject the fracturing liquids. For example, the pumps may be required to pump over 70 gallons per second of the liquid at pressures over 15,000 psi and may require over 2000 hp to run at these specifications. In many instances, electric motors may be called upon to operate these types of pumps.

On-site power systems typically supply power for these high horsepower electric motors. Examples of these power systems include electric generators coupled to prime movers such as diesel engines or gas turbines. Unfortunately, prime movers such as these may have high exhaust emissions because of their corresponding high horse power requirements. Hence, the hydraulic fracturing industry would appreciate new technology to reduce emissions at field locations.

BRIEF SUMMARY

Disclosed is a system for supplying electric power to a plurality of electric motors coupled to formation treatment pumps. The system includes: a plurality of electric motors, each motor coupled to a well treatment pump configured to treat an earth formation by pumping a liquid into a borehole penetrating the earth formation; a mobile substation configured to connect to and receive power from a utility electric grid; a plurality of mobile electric power generating units configured to generate electric power; and a controller configured to (i) receive a total required flow rate of the liquid; (ii) calculate a total amount of electric power required to achieve the required total flow rate; (iii) receive an amount of power available from the utility electric grid; (iv) direct the substation to provide electric power to the plurality of electric motors; and (v), direct one or more electric power generating units in the plurality of electric power generating units to provide electric power to the plurality of electric motors according to a priority order to meet the total amount of electric power, if the required amount of electric power exceeds the amount of power available from the utility electric grid.

Also disclosed is a method for supplying electric power to a plurality of electric motors coupled to hydraulic fracturing pumps. The method includes: receiving, using a controller, a total required flow rate of fracturing liquid to be pumped; calculating, using the controller, a total amount of electric power required to achieve the required total flow rate; receiving, using the controller, information concerning an amount of power available from the utility electric grid; directing, using the controller, a mobile substation connected to a utility electric grid to provide electric power to the plurality of electric motors; and directing, using the controller, one or more mobile electric power generating units in a plurality of electric power generating units to provide electric power to the plurality of electric motors according to a priority order to meet the total amount of electric power, if the required amount of electric power exceeds the amount of power available from the utility electric grid.

BRIEF DESCRIPTION OF THE DRAWINGS

The following descriptions should not be considered limiting in any way. With reference to the accompanying drawings, like elements are numbered alike.

DETAILED DESCRIPTION

Figure 1A:
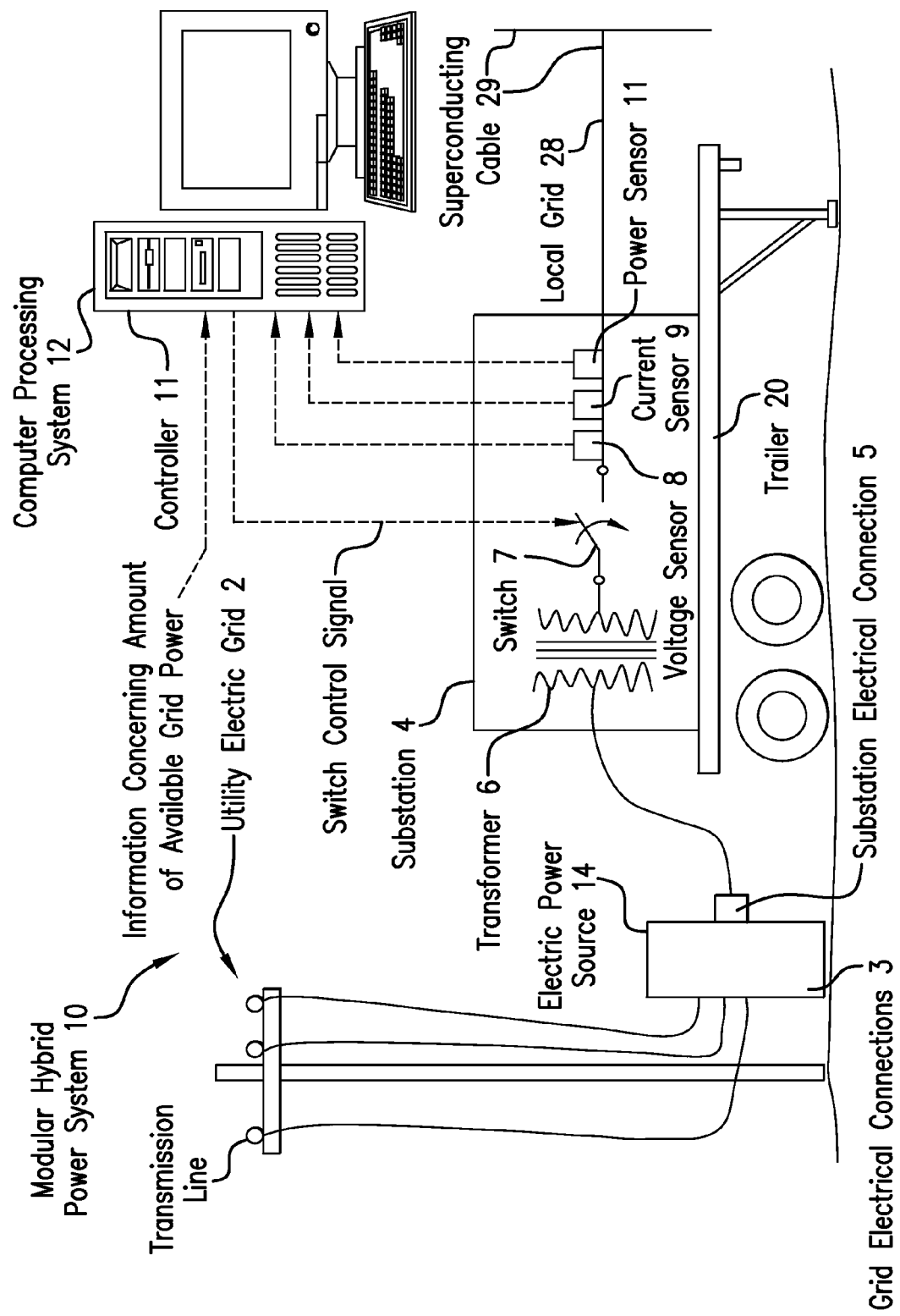
FIGS. 1A-1D, collectively referred to as FIG. 1, illustrates a schematic representation of an exemplary embodiment of a modular hybrid power system at a field site location.

A detailed description of one or more embodiments of the disclosed apparatus and method presented herein by way of exemplification and not limitation with reference to the figures.

Disclosed are embodiments of a modular hybrid power system for supplying electric power for hydrocarbon extraction at a field location and specifically for supplying electric power to a hydraulic fracturing system.

FIG. 1 illustrates a representation of an exemplary embodiment of a modular hybrid power system 10 located at a field site. The term "modular" is used to indicate that various mobile modules having different functions may make up the system 10 and that the exact configuration of the modules is dependent on the electric power requirements at the field site. Each mobile module may be mounted on a trailer 20 that is transportable on public roads. The hybrid power system 10 is configured to supply electric power to field site equipment requiring such power such as electric motors and electronic devices. A controller 11, which may be a mobile module, is configured to control electric power distribution from a plurality of electric power sources 14 to a plurality of electric devices 19 requiring electric power. The plurality of electric power sources 14 includes a utility electric grid and one or more fuel-consuming generating units. The power is distributed by the controller 11 according to a priority order, which places a higher priority on using power from certain power supplies first based on a desired criterion. One criterion for example may be lowest total emissions at the field site. Using this criterion, power would be supplied first by the utility electric grid and then, if required, by a fuel consuming generating unit having the lowest emissions for the power required. Additional fuel consuming generating units may be added according to the priority order until the total power requirement is satisfied. If the amount of power available from the utility electric grid decreases or goes to zero, then the controller can automatically direct more power supplies to supply the required power according to the field site equipment according to the priority order. The priority order can also be based on other criteria such as power supply reliability for any critical functions where highly reliable power is required.

As illustrated in FIG. 1A, a utility electric grid 2 includes accessible electrical connections 3. The hybrid power system 10 includes a substation 4 that is configured to connect to the electrical connections 3 using substation electrical connections 5. The substation 4 may include a transformer 6 for transforming line voltage of the utility electric grid 2 to one of more voltages suitable for powering the field site equipment and various switches 7 for controlling the power out of the substation 4. The switches 7 may be controlled locally such as at a local control panel (not shown) or remotely such as by the controller 11. A voltage sensor 8, a current sensor 9, and/or a power sensor 11 may be included in the substation 4 for monitoring the electric power supplied by the substation 4. This substation electrical information may be monitored by the controller 11. In one or more embodiments, the controller 11 may be implemented by a computer processing system 12. It can be appreciated that in one or more embodiments electric power from the substation 4 may be fed to the plurality of electrical devices 19 using a local grid 28 that is local to the field site.

Figure 1B:
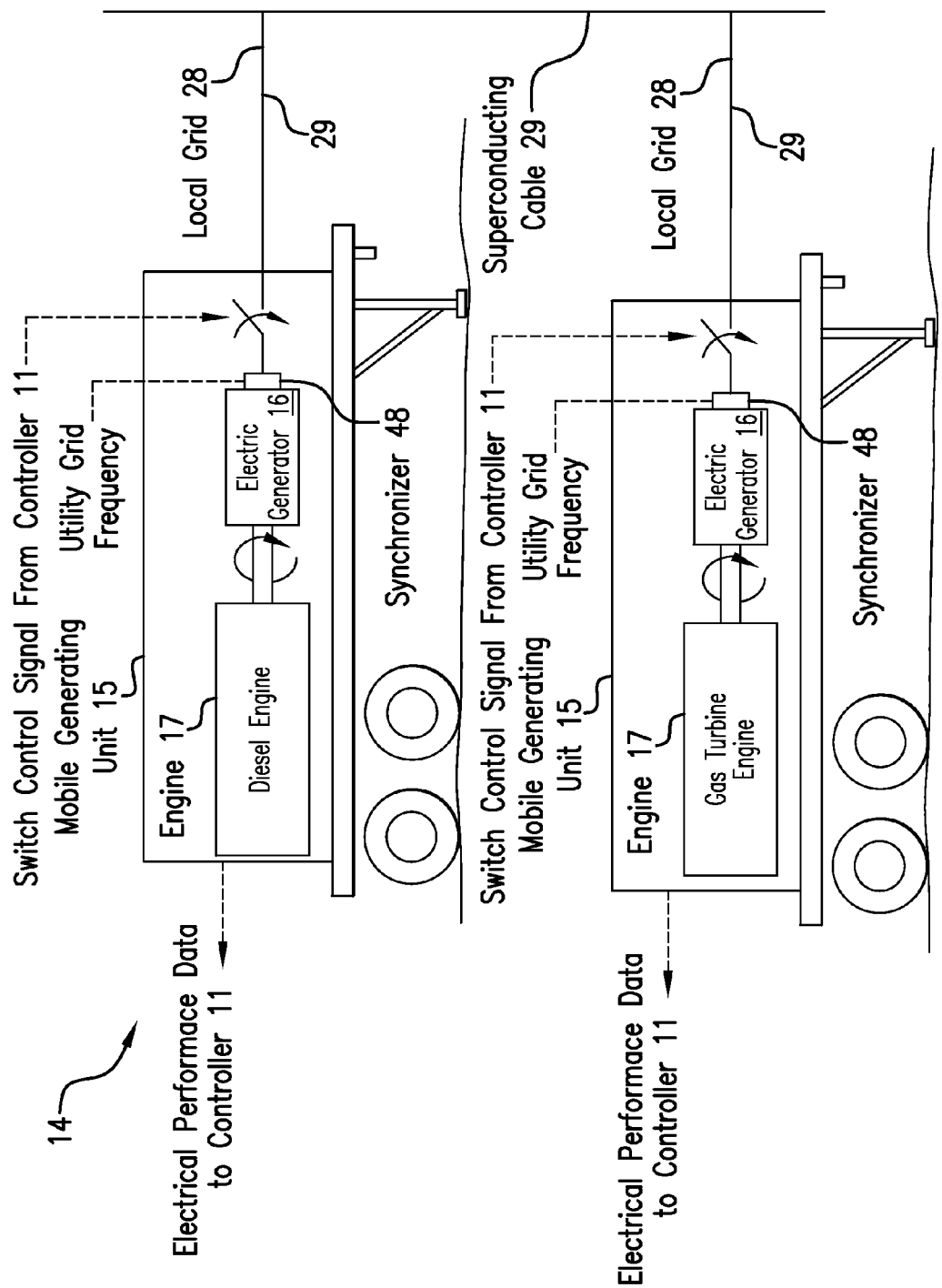
Figure 1C:
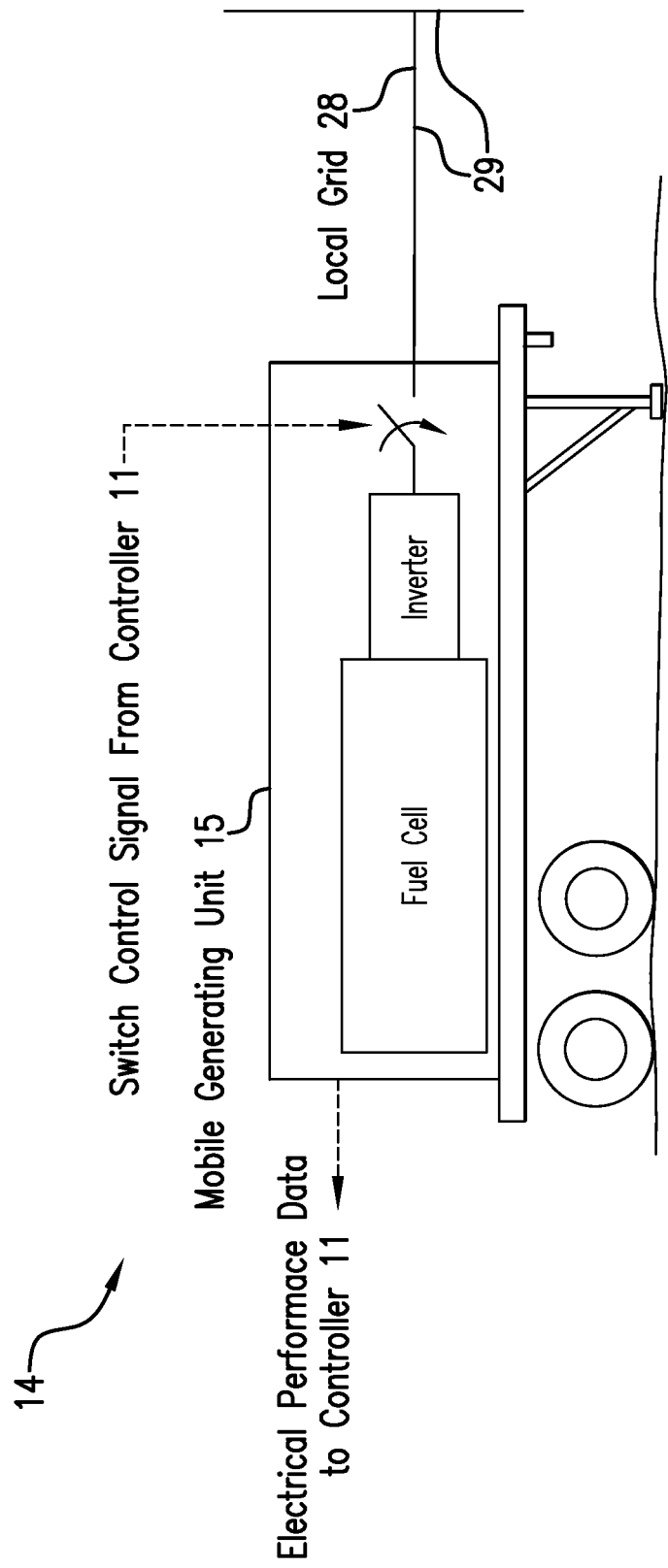
Figure 1D:
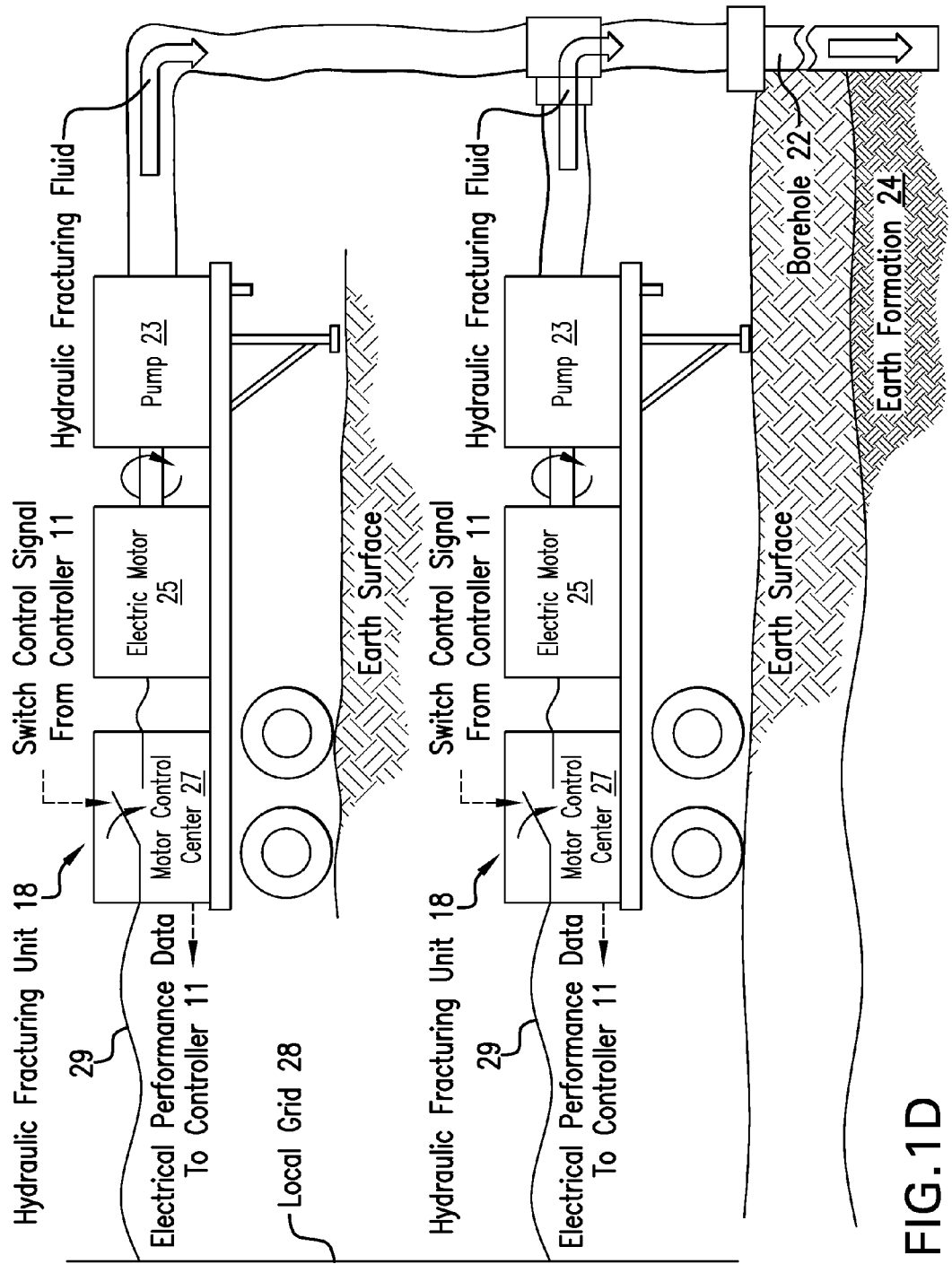

The plurality of electric power sources 14 may also include a plurality of mobile fuel-consuming electric generator units 15 as illustrated in FIGS. 1B and 1C. Each of the generator units 15 may include a synchronizer 48 that is configured to synchronize the frequency of the locally generated electric power to the frequency of the utility electric grid in order to have both types of sources supply power to the field site equipment at the same time. In one or more embodiments, one or more of the generator units 15 includes an electric generator 16 that is coupled to an engine 17. Non-limiting embodiments of the engine 17 include a diesel engine, a gasoline-powered engine, a natural gas-powered engine, and a gas turbine. In one or more embodiments, one or more of the generator units 15 is a fuel cell. Each of the power sources has an emissions rating or value associated with it such as an amount of emissions emitted per kilowatt of power generation. It can be appreciated that the utility electric grid accessed via the substation 4 may have an emissions rating of zero that reflects no emissions at the field site. As with the substation 4, voltage, current, and/or power sensors may be used at each of the generator units 15 to monitor electrical performance. Data from these sensors may be transmitted to the controller 11 for monitoring and control purposes.

A plurality of hydraulic fracturing units 18 is illustrated in FIG. 1. Each hydraulic fracturing unit 18 is configured to inject fracturing fluid into an earth formation 24 via borehole 22 in order to fracture rock in that formation. The fractured rock creates spaces through which hydrocarbons can flow for extraction purposes. Each hydraulic fracturing unit 18 includes a pump 23 that is configured to pump the fracturing liquid into the borehole 22. In general, the pump 23 can generate pressures over 15,000 psi with a flow rate exceeding 70 gallons per second. The pump 23 is driven by an electric motor 25. The electric motor 25 may be rated for over 2,000 hp in order for the pump 23 to generate the high pressure and flow rate. The electric motor 25 is controlled by a motor control center (MCC) 27. The motor control center 27 is configured to control operation of the electric motor 25 and thus the pump 23. Motor operations may include starting and stopping the motor, changing rotational motor speeds, and dynamically braking the motor and the pump. For controlling operation of the electric motor 25, the MCC 27 includes components such as switches and contactors for applying voltage to and removing voltage from the motor 25. These components may be operated locally such as from a local control panel (not shown) or remotely by the controller 11. Electric power to the motor control center 27 may be supplied by any of the power sources or combination thereof in the plurality of electric power sources 14 as directed by the controller 11. For mobility purposes, the pump 23, the electric motor 25, and the MCC 27 are mounted on a mobile platform such as the trailer 20. It can be appreciated that one or more pumps may be mounted on the mobile platform and that a single electric motor may be coupled to the one or more pumps on the mobile platform.

As noted above, the controller 11 is configured to distribute power to the plurality of hydraulic fracturing units 18 and other field site equipment according to the priority order. The priority order may be implemented by an algorithm 13 that is executed by the controller 11. Criteria for the priority order may include emissions at the field site or power reliability or some combination thereof that may include weighting factors. Reliability considerations may include maintenance considerations such as time-to-shutdown for maintenance. Other factors may also be included in the priority order. In general, the utility grid power may be given a first priority due to its zero emissions at the field site and high reliability with little or no field maintenance required.

Figure 2:
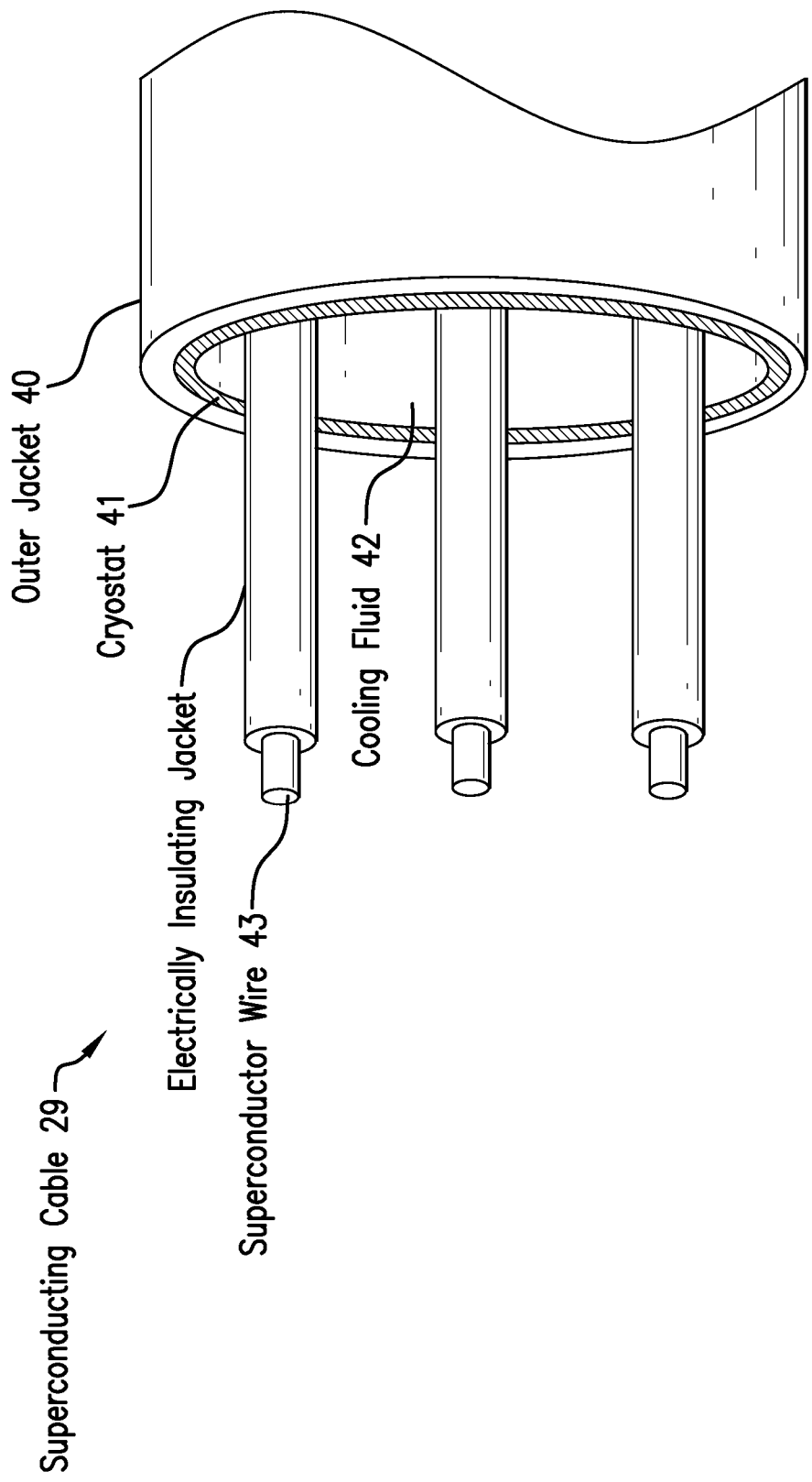
FIG. 2 depicts aspects of a superconducting cable used to conduct electricity between various components at the field site location.

It can be appreciated that, in one or more embodiments, the local grid 28 may include one or more superconducting cables 29. An advantage of using superconducting cables is that there can be a cost savings as a result of using low-voltage electric motors, which can be less expensive than medium-voltage motors. For a given power requirement, low-voltage motors require a higher amperage than medium-voltage motors, but with zero or near-zero resistance the superconducting cables will not lose useful power due to resistance losses (i.e., $I^2R$ losses). FIG. 2 depicts aspects of one superconducting cable 29 for conducting electricity between various components at the field site location. The superconducting cable 29 includes an outer jacket 40 that contains a cryostat 41, which is configured to contain and thermally insulate a cryogenic environment. The cryogenic environment is established and maintained by a cooling fluid 42. Non-limiting embodiments of the cooling fluid 42 include liquid nitrogen and helium gas. Immersed in the cryogenic environment are superconductor wires 43, three of which are illustrated for three-phase power transmission. Each superconductor wire 43 is electrically insulated from other superconductor wires by an electrically insulating jacket. It can be appreciated that each superconductor wire may include one or more strands of a superconductor material that exhibits zero or near-zero electrical resistance at cryogenic temperatures. In one or more embodiments, the superconductor material is a high temperature superconductor (HTC) that can achieve the superconducting state at temperatures greater than 20° K (−253° C.). In general, HTC materials may be used in superconducting power applications that can be cooled with liquid nitrogen at 77° K (−196° C.). The superconducting cables 29 may also have other configurations such as each superconducting wire 43 being disposed in a separate cryostat or the superconducting wires being configured in a triaxial configuration having a common axis. Superconducting cables are commercially available from Superconductor Technologies, Inc. of Austin, Tex. Not shown are other components, such as refrigeration or cryogenic coolers, necessary to supply the cooling fluid 42.

Figure 3:
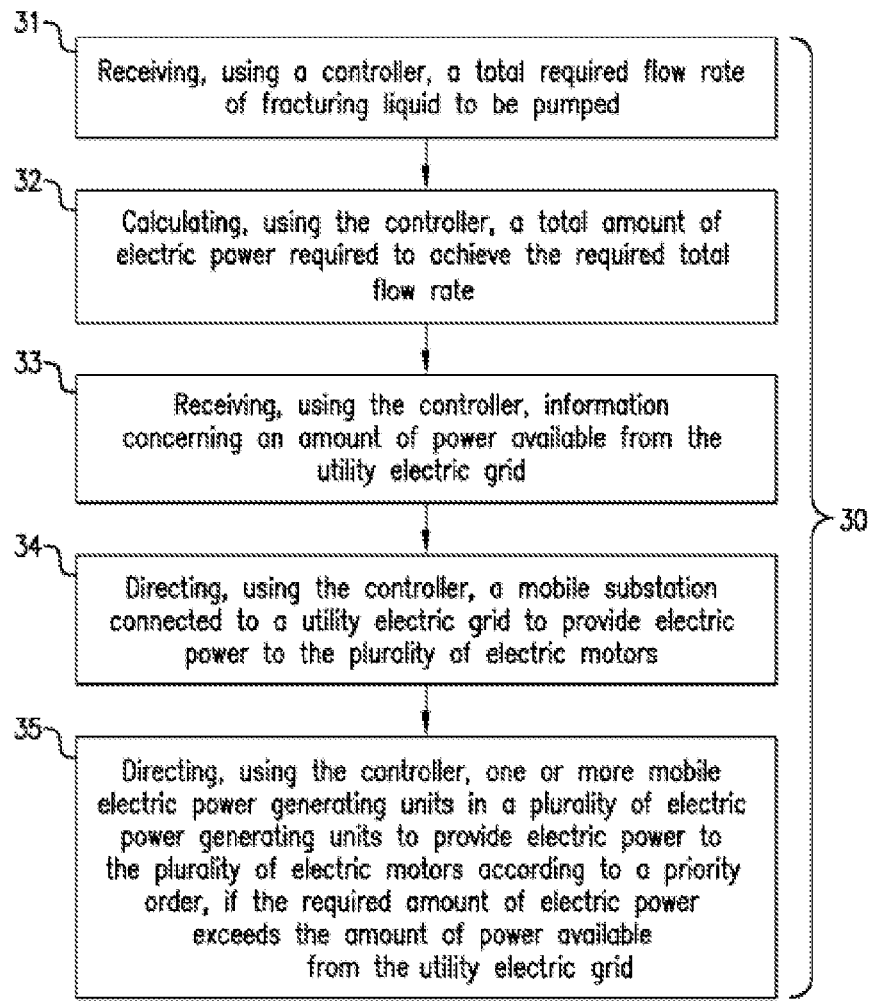
FIG. 3 is flow chart for supplying electric power to a plurality of electric motors coupled to hydraulic fracturing pumps.

FIG. 3 is a flow chart for a method 30 for supplying electric power to a plurality of electric motors coupled to hydraulic fracturing pumps. The method 30 may be implemented by the algorithm 13 in the controller 11. Block 31 calls for receiving a total required flow rate of the fracturing liquid. Block 32 calls for calculating a total amount of electric power required to achieve the required total flow rate. The total amount of electric power may be calculated by determining which of the available pumps are required to meet the required total flow rate and then summing the electric power requirement of each of the electric motors coupled to those pumps. The available pumps selected are selected according to the priority order. Block 33 calls for receiving information concerning an amount of power available from the utility electric grid and may be communicated by a dedicated wireline, an internet connection, or wirelessly such as by radio. This information is generally provided by the utility operating the utility electric grid. Block 34 calls for directing a mobile substation to provide electric power to the plurality of electric motors. Block 35 calls for directing one or more electric power generating units in the plurality of electric power generating units to provide electric power to the plurality of electric motors in a priority order if the required amount of electric power exceeds the amount of power available from the utility electric grid until the total amount of electric power required is satisfied. In one or more embodiments, the priority order gives an electric power generating unit having a lower amount of emissions a higher priority than an electric power generating unit having a higher amount of emissions. The method 30 may also call for automatically starting one or more mobile generating units according to the priority order and connecting those units to the local grid if already activated units fail or reduce power output or if more hydraulic flow capacity is needed. Alternatively, mobile generating units may be shutdown in a reverse sequence of the priority order if the total hydraulic flow capacity required is reduced. The above steps in the method 30 may be implemented by a controller having wired or wireless communications with the appropriate mobile modules. In one or more embodiments, the controller is configured to determine a lowest emissions combination of mobile electric power generating units that provides the total amount of required electric power in combination with electric power received from the utility electric grid. In one or more embodiments, the controller is configured to transmit a signal to a utility operating the utility electric grid informing the utility of an amount of electric power being received by the system. In one or more embodiments, the controller is configured to receive a signal from the utility operating the utility electric grid that informs the controller that the utility is reducing the amount of power available from the utility electric grid and to direct one or more of the mobile electric generating units to make up the lost power from utility electric grid in accordance with the priority order. The method 30 may also call for using one or more superconducting cables to supply the electric power to one or more electric motors in the plurality of electric motors.

It can be appreciated that use of the modular hybrid power system 10 provides many advantages. A first advantage is that an environmental impact at the field site having the hydraulic fracturing pumps is reduced. The environmental impact is reduced due to reducing the need for additional mobile electric generating units operating because of using electric power from the utility grid. Accordingly, the amount of environmental emissions due to engine exhaust for example is also reduced. Another advantage is that the reliability of the electric power supplied to the local grid can be increased when performing sensitive tasks requiring electric power. The reliability can be increased by assigning a higher priority in the priority order to mobile electric generating units having higher reliability. Yet another advantage is that additional mobile electric power generating units can be activated automatically upon the controller sensing a reduction in power output from any power source in the plurality of electric power sources.

In support of the teachings herein, various analysis components may be used, including a digital and/or an analog system. For example, the controller 11 or the computer processing system 12 may include a digital and/or analog system. The system may have components such as a processor, storage media, memory, input, output, communications link (wired, wireless, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The term "configured" relates to a structural limitation of an apparatus that allows the apparatus to perform the task or function for which the apparatus is configured.

The flow diagram depicted herein is just an example. There may be many variations to this diagram or the steps (or operations) described therein without departing from the spirit of the invention. For instance, the steps may be performed in a differing order, or steps may be added, deleted or modified. All of these variations are considered a part of the claimed invention.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for supplying electric power to a plurality of electric motors coupled to formation treatment pumps, the system comprising:
    a plurality of electric motors, each motor coupled to a well treatment pump configured to treat an earth formation by pumping a liquid into a borehole penetrating the earth formation;
    a mobile substation configured to connect to and receive power from a utility electric grid;
    a plurality of mobile electric power generating units configured to generate electric power; and
    a controller configured to (i) receive a total required flow rate of the liquid; (ii) calculate a total amount of electric power required to achieve the required total flow rate; (iii) receive an amount of power available from the utility electric grid; (iv) direct the substation to provide electric power to the plurality of electric motors; and (v), direct one or more electric power generating units in the plurality of mobile electric power generating units to provide electric power to the plurality of electric motors according to a priority order to meet the total amount of electric power, if the required amount of electric power exceeds the amount of power available from the utility electric grid.

2. The system according to claim 1, further comprising one or more superconducting cables configured to supply electrical power to one or more electric motors in the plurality of electric motors.

3. The system according to claim 1, wherein a mobile electric power generating unit having a lower amount of emissions has a higher priority in the priority order than a mobile electric power generating unit having a higher amount of emissions.

4. The system according to claim 1, wherein each electric motor in the plurality of electric motors is coupled to a motor control center configured to start or stop the corresponding electric motor.

5. The system according to claim 4, wherein the controller is coupled to each of the motor control centers.

6. The system according to claim 1, wherein the controller is further configured to determine a lowest emissions combination of mobile electric power generating units that provides the total amount of required electric power in combination with electric power received from the utility electric grid.

7. The system according to claim 1, wherein the controller is further configured to transmit a signal informing of an amount of electric power being received by the system.

8. The system according to claim 1, wherein each of the of mobile electric power generating units comprises a synchronizer configured to synchronize the frequency of electric power generated by the corresponding mobile electric power generating unit to the frequency of the utility electric grid.

9. The system according to claim 8, wherein one or more electric motors in the plurality of electric motors is coupled to two or more pumps.

10. The system according to claim 1, wherein the mobile substation is disposed on a trailer configured for operation on public roads.

11. The system according to claim 1, wherein each electric motor in the plurality of electric motors is disposed on a trailer configured for operation on public roads.

12. The system according to claim 1, wherein the controller is disposed on a trailer configured for operation on public roads.

13. A method for supplying electric power to a plurality of electric motors coupled to hydraulic fracturing pumps, the method comprising:
    receiving, using a controller, a total required flow rate of fracturing liquid to be pumped;
    calculating, using the controller, a total amount of electric power required to achieve the required total flow rate;
    receiving, using the controller, information concerning an amount of power available from a utility electric grid;
    directing, using the controller, a mobile substation connected to the utility electric grid to provide electric power to the plurality of electric motors; and
    directing, using the controller, one or more mobile electric power generating units in a plurality of mobile electric power generating units to provide electric power to the plurality of electric motors according to a priority order to meet the total amount of electric power, if the required amount of electric power exceeds the amount of power available from the utility grid.

14. The method according to claim 13, further comprising synchronizing a frequency of electric power generated by the one or more electric generating units to the frequency of the utility electric grid using a synchronizer disposed at each of the mobile electric power generating units.

15. The method according to claim 13, wherein the controller comprises a processor.

16. The method according to claim 13, wherein each electric motor in the plurality of electric motors is coupled to a motor control center configured to start or stop the corresponding electric motor and the controller is coupled to each of the motor control centers.

17. The method according to claim 13, wherein the controller is further configured to determine a lowest emissions combination of mobile electric power generating units that provides the total amount of required electric power in combination with electric power received from the utility electric grid.

18. The method according to claim 13, further comprising transmitting a signal informing of an amount of electric power being received by the system.

19. The method according to claim 13, further comprising receiving a signal that informs the controller that the amount of power available from the utility electric grid is being reduced.

20. The method according to claim 19, further comprising directing one or more of the mobile electric power generating units to make up the lost power from the electric utility grid in accordance with the priority order.

21. The method according to claim 13, further comprising using one or more superconducting cables to supply the electric power to one or more electric motors in the plurality of electric motors.

* * * * *